United States Patent

[11] 3,598,430

| [72] | Inventors | Daniel J. Maher<br>Fort Lauderdale;<br>Robert W. O'Halloran, Hollywood, both of, Fla. |
|---|---|---|
| [21] | Appl. No. | 844,537 |
| [22] | Filed | July 24, 1969 |
| [45] | Patented | Aug. 10, 1971 |
| [73] | Assignee | Hurricane Pipe Manufacturing, Inc.<br>Fort Lauderdale, Fla. |

[54] PIPE CONNECTOR
1 Claim, 5 Drawing Figs.

[52] U.S. Cl..................................................... 285/24,
285/111, 285/376, 285/423
[51] Int. Cl............................................................ F16l 35
[50] Field of Search............................................ 285/376,
24, 81, 27, 111, 306, 5, 6, 423

[56] References Cited
UNITED STATES PATENTS

| 2,736,384 | 2/1956 | Potts | 285/81 X |
| 2,819,097 | 1/1958 | Lang | 285/306 X |

FOREIGN PATENTS

| 761,420 | 11/1956 | Great Britain | 285/376 |

Primary Examiner—Dave W. Arola
Attorney—Eugene F. Malin

ABSTRACT: A pipe connector in which a section of the connector is attached to the ends of each of two pieces of pipe and in which the ends are locked together by turning the two sections relative to each other.

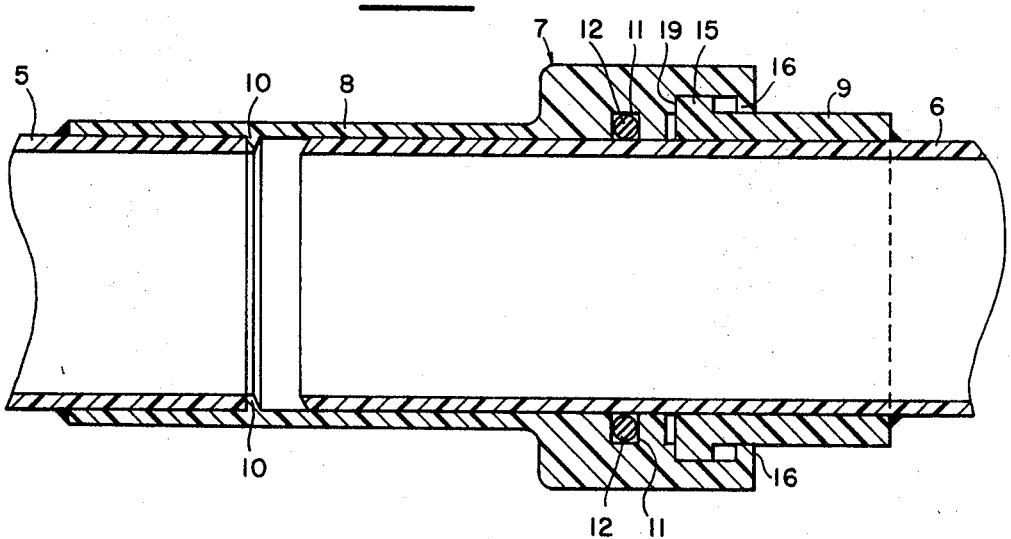
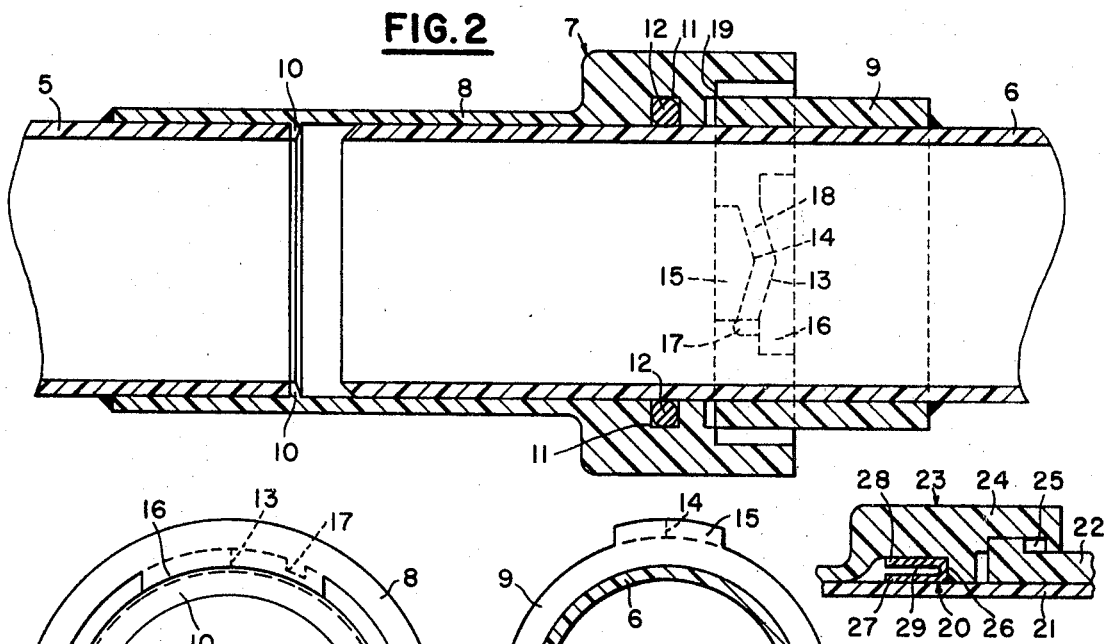

3,598,430

PIPE CONNECTOR

BACKGROUND OF THE INVENTION

1. Field of the Invention

This invention relates in general to a connector and in more particularly to a connector for fastening two hollow members together. The invention is illustrated and described as being used to fasten two pieces of plastic pipe together, however it may be used to fasten either hollow members or solid members and still fall within the scope of this disclosure. It is to be understood that the use of the word pipe is to be interpreted in its broadest sense.

2. Description of the Prior Art

There are many devices in use today for fastening two pieces of pipe together. One widely used method is to bell the end of one of the pieces of pipe so it will receive the second piece of pipe. When the two are joined together by a suitable adhesive a leakproof joint is formed.

Another popular method of joining two pieces of pipe is by abutting the ends of the pieces and clamping a connector around the juncture to prevent it from leaking.

SUMMARY OF THE INVENTION

It is the primary object of our invention to provide a pipe connector which may be used to join two pieces of pipe together in a leakproof relationship and still permit the two pieces of pipe to move relative to each other to allow for expansion and contraction of the pipes.

Another object of my invention is to provide a pipe connector in which the fluid pressure within the pipe helps to hold the two elements of the connector in a rigid relationship to each other.

It is a further object of my invention to provide a pipe connector which may be quickly and easily fastened and disconnected without the use of special tools of equipment.

Another object of my invention is to provide a pipe connector which is sturdy in construction, relatively light in weight, economical in price, adaptable to a wide variety of pipe sizes, and relatively simple to manufacture.

Further features, objects, and advantages will either be specifically pointed out or become apparent when, for a better understanding of the invention, reference is made to the following written description taken in conjunction with the accompanying drawing.

BRIEF DESCRIPTION OF THE DRAWING

FIG. 1 is a cross-sectional view of two pipe members joined together with a pipe connector according to my invention;

FIG. 2 is a cross-sectional view similar to FIG. 1, taken substantially 90 degrees therefrom, with the holding means shown in dotted line;

FIG. 3 is an end view of a piece of pipe with one element of the connector attached thereto;

FIG. 4 is an end view of a second piece of pipe with the second element of the connector attached thereto;

FIG. 5 is a cross-sectional view of a modified sealing means.

DESCRIPTION OF THE PREFERRED EMBODIMENT

Referring now to FIG. 1, two pieces of pipe 5 and 6 are shown as being held together by means of pipe connector 7. Pipe connector 7 is comprised of two sections 8 and 9 with element 9 being attached to element 8.

Section 8 has an annular projection 10 on the inside thereof against which pipe 5 rests and which forms a stop member for pipe 5. Section 8 also has a groove 11 into which an O-ring 12 fits to contact pipe 6.

Section 8 of connector 7 has a plurality of inwardly extending lips 16 shown here as, but not limited to, two in number. As shown in dotted line in FIG. 2, the back surface of lip 16 is grooved as at 13 to receive the V-shaped edge 14 of fastener 15 which is attached to and is a part of section 9.

V-shaped edge 13 of projection 16 has a stop member 17 near one end thereof to prevent member 15 from being turned through 360 degrees. It also serves as a locator to properly position members 15 and 16 relative to each other.

It will be noted in FIG. 2 that when member 9 is inserted all the way into member 8 the two members 15 and 16 have a space 18 therebetween. The fluid pressure within the pipe will cause pipe 6 to move outwardly and when it does the inclined surfaces of member 15 will seat within the V-grooves 13 of member 16 to self-locate it. As the two surfaces on 15 and 16 are of substantially the same shape the members will seat firmly against each other. As pipe 6 is connected to connector member 8 only by O-ring 12 these two members are permitted to move relative to each other when the pipe sections expand or contract. The space 18 also permits expansion or contraction and at the same time prevents the two members 8 and 9 from being separated.

FIG. 5 illustrates a modification of my connector in which a Chevron gasket 20 is used instead of an O-ring. Pipe 21 has a section 22 of connector 23 attached thereto with pipe 21 extending into section 24 also. The connector 23 has the self-locating flanges described above in regard to the modification shown in FIGS. 1 through 4.

Chevron gasket 20 is located within the space 26 provided in member 24. It is comprised of a relatively thin flange 27 and a thicker flange 28 joined together at one end thereof, to provide a space 29 therebetween. The open end of the gasket is placed to face the direction of the fluid flow into space 26.

Operation of the pipe connector disclosed in FIGS. 1 to 4 is as follows: with the two sections separated, section 8 is attached to pipe end 5 by suitable adhesive means with pipe 5 abutting annular projection 10. O-ring 12 is then inserted into position in annular groove 11. Section 9 is attached to pipe end 6 by suitable adhesive mans.

The end of pipe 6 is then inserted into section 8 past O-ring 12 and in joining the two members together member 9 is turned so that projections 15 thereon will not be alignment with projections 16 of member 8. As pipe 6 enters member 8 the member 9 will also enter until projection 15 abuts against the surface 19 which acts as a stop member.

With the two sections 8 and 9 in this position they may be turned relative to each other so that projection 15 strikes stop member 17 on member 16. When this occurs members 15 and 16 are aligned as shown in dotted line in FIG. 2.

When pressure is introduced into pipe sections 5 and 6 through the medium of a fluid within the pipe a portion of the fluid will strike the end surface of pipe 6 and cause the two pipe sections to move outwardly from each other. As projection 15 on pipe 6 contacts projection 16 the configuration of the two surfaces will cause them to come together in a locking relationship.

When the pressure within pipes 5 and 6 is reduced, due to the space 18 between members 15 and 16, the two members 8 and 9 may be moved longitudinally relative to each other and the leakproof connection will still be maintained.

To disconnect the two pipe members, section 9 is moved in the opposite direction until projections 15 and 16 are again out of alignment and then pipe 6 can be withdrawn from member 8. When the two sections are pushed together and turned the V-sides of projection 15 ride up out of groove 13 in projection 16 to permit the two sections to be separated.

Operation of the modification shown in FIG. 5 is as follows: the two sections of connector 23 are constructed the same as the sections of connector 7 therefore the placing of the two sections together is the same as described above. However, once the pipes are connected the Chevron gasket 20 operates different from the O-ring. As the fluid under pressure within the pipe moves into space 26 it will enter space 29 and cause flanges 27 and 28 to separate. As they separate they seal the space to prevent the fluid from escaping between connector section 24 and pipe 21.

After the pressure is reduced within the pipe the flanges 27 and 28 will assume their original positions. In so doing any fluid within space 26 may slowly escape from the space to the outside by passing between connector 23 and pipe 21.

Thus it will be seen that there has been provided a new and novel pipe connector which makes it easy to connect and disconnect two pieces of pipe and which provides a leakproof seal with a wide degree of flexibility between the pipes when they are connected.

The foregoing disclosure and description of the invention is illustrative and explanatory thereof and various changes in the size, shape and material, as well as in the details of the illustrated construction may be made, within the scope of the appended claims, without departing from the spirit of the invention.

We claim:

1. A releasable expansion pipe connection for coupling and aligning two pipes comprising,
   a first and second pipe,
   a male pipe member connected to said first pipe,
   a mating female pipe member connected to said second pipe,
   said male member includes a male body portion and a pair of flange portions projecting radially outwardly from opposite sides of said male body portion, said flange portions extend circumferentially less then one-quarter of the length of the circumference about said male body portion,
   said flange portions includes an inner generally V-shaped aligning face,
   said female member includes a female body portion and a pair of abutting portions projecting radially inwardly from opposite sides of said female body portion for engagement with said flange portions, said abutting portions extend circumferentially less than one-quarter of the length of the circumference about the inside of said female body portion, said abutting portions includes a inner generally V-shaped aligning face that contacts face to face with said flange aligning face, said V-shaped aligning face on said female member diverging in a direction toward said second pipe, a stop member connected to one said abutting portion adjacent one side of said abutting portion aligning face,
   said male member movable into the female member and into locked position in the female member by rotating one member relative to the other member until said one of said flange portions abuts said stop member and upon relative movement of said male and female member said V-shaped aligning faces will be in mating contact, said flange portions, and abutting portions sized to allow longitudinal movement of the pipes due to expansion, and
   a sealing cavity between the mating members to provide a seal means that moves back and forth with the expanding pipes.